United States Patent [19]

Fukuda et al.

[11] Patent Number: 5,115,390

[45] Date of Patent: May 19, 1992

[54] CONTROL DATA INPUT APPARATUS

[75] Inventors: Joji Fukuda, Kanagawa; Seiichi Misawa, Saitama; Takaaki Enomoto, Kanagawa, all of Japan

[73] Assignee: Sony Corporation, Tokyo, Japan

[21] Appl. No.: 434,432

[22] Filed: Nov. 13, 1989

[30] Foreign Application Priority Data

Nov. 15, 1988 [JP] Japan ................... 63-288125

[51] Int. Cl.$^5$ ......................... G06F 15/403
[52] U.S. Cl. ................... 364/146; 364/188; 368/10
[58] Field of Search ........... 364/145, 146, 143, 140, 364/188; 358/335, 342; 368/10; 455/171, 181, 185, 186; 360/33.1

[56] References Cited

U.S. PATENT DOCUMENTS

| | | | |
|---|---|---|---|
| 4,193,120 | 3/1980 | Yello | 364/145 |
| 4,325,081 | 4/1982 | Abe et al. | 455/171 X |
| 4,431,866 | 2/1984 | Toyomura | 364/709.06 X |
| 4,631,601 | 12/1986 | Brugliera et al. | 358/335 |
| 4,646,224 | 2/1987 | Ransburg et al. | 364/146 |
| 4,755,883 | 7/1988 | Uehira | 358/335 |
| 4,905,212 | 2/1990 | Wakahara | 368/10 |
| 4,908,713 | 3/1990 | Levine | 455/181 X |
| 4,977,310 | 12/1990 | Studer et al. | 364/146 X |

Primary Examiner—Joseph Ruggiero
Assistant Examiner—Allen M. Lo
Attorney, Agent, or Firm—Lewis H. Eslinger; Jay H. Maioli

[57] ABSTRACT

A control data input apparatus for feeding control data to an electronic apparatus, wherein words of a natural language representing a plurality of control commands for a controlled system are received and, after analysis of the natural language expressed by a combination of the words, the control commands are fed to the controlled system so that control of such system is rendered executable by the input natural language. The apparatus comprises word input system with an input keyboard provided corresponding to words of a natural language which represent a plurality of control commands for a controlled system, and natural language processing system responsive to a word input from the input keyboard of the word input system and functioning to analyze the natural language expressed by a combination of the words from the word input system, thereby forming data of control commands represented by the natural language. The control commands represented by the natural language and analyzed by the natural language processing system are fed to a controlled system.

3 Claims, 2 Drawing Sheets

CONTROL DATA INPUT APPARATUS

BACKGROUND OF THE INVENTION

1. Field of the Invention

The present invention relates to a control data input apparatus for feeding control data to a variety of electronic apparatus.

2. Description of the Prior Art

It has been known heretofore that, a variety of home electronic apparatus such as video tape recorders, television receivers and so forth, have transitionally provided progressive enhancements multiple functions is by the use of program timers. For example, a program reserve function is provided for a video tape recorder by means of a program timer. Generally prior such art multifunctional electronic apparatus are equipped with many switches. For example, setting switches with various functions are provided in addition to the power, switch of the apparatus itself. Moreover, desired functions of the electronic apparatus can be selectively set by actuating such setting switches. Therefore, the procedure for setting the functions for the operation of inputting control data becomes more complicated in accordance with the enhancement of the electronic apparatus by the added functions. In the electronic apparatus of the type mentioned, desired functions are settable by actuating individual setting switches for such functions in the predetermined procedure which conforms to a supplied instruction manual. The control data inputting operation is simplified by the use of a bar code reader or the like.

With the recent development of artificial intelligence commanding the operation of such electronic apparatus can be done by the use of a natural language or human words and, studies are in progress with regard to a man-machine interface based on natural language processing. However, in the present technical stage, the man-machine interface with voice recognition is considered to be far from being able to realize continuous voice recognition of unspecified talkers. Further in the man-machine interface based on experimental-level natural language processing, it is customary to input various control data by the use of a data input unit with a computer type keyboard adapted for inputting alphabetical letters and/or kana characters.

In the electronic apparatus equipped with such highly enhanced multiple functions, the function setting procedure is predetermined and it is necessary to actuate the individual setting switches in accordance with the complicated procedure written in the instruction manual. In case the procedure fails to be executed properly, the correct setting procedure to be started over again. Therefore, it has been impossible heretofore for general users, who are not skilled in manipulating such electronic apparatus, to completely utilize the various functions.

Furthermore, if the electronic apparatus mentioned is furnished with an artificial intelligence for commanding the operation by a man-machine interface based on natural language processing, the complicated manipulation for setting the functions can be eliminated. However, it is still far from the stage of practically applying the man-machine interface with voice recognition. Similarly in the data input apparatus equipped with a computer-type keyboard adapted for inputting alphabetical letters and/or kana characters which is employed in the man-machine interface based on experimental-level natural language processing, it is impossible for general users who are not skilled in manipulating the electronic apparatus to achieve complete manipulation of the electronic apparatus.

OBJECTS AND SUMMARY OF THE INVENTION

Accordingly, it is an object of the present invention to provide an improved control data input apparatus free from the defects and disadvantages encountered in the prior art.

Another object of the present invention is to provide an improved control data input apparatus that is easy to handle even for an unskilled person.

A further object of the present invention is to provide an improved control data input apparatus which can function as an improved man-machine interface.

A still further object of the present invention is to provide an improved control data input apparatus which includes a natural language processing unit.

For achieving the above-described objects in the apparatus the present invention discloses control data input to an electronic apparatus, wherein words of a natural language representing a plurality of control commands for a controlled system are received by the controlled system and, after analysis of the natural language expressed by a combination of the words, the control commands are fed to the controlled system so that control of such system is rendered executable by the input natural language.

The controlled data input apparatus of the present invention comprises word input means provided with an input keyboard corresponding to words of a natural language which represent a plurality of control commands for a controlled system and natural language processing means responsive to a word input from the input keyboard of the word input means and functioning to analyze the natural language expressed by a combination of the words from the word input means, thereby forming data of control commands represented by the natural language, and wherein the control commands represented by the natural language analyzed by the natural language processing means are fed to a controlled system.

Another feature of the present invention is in the provision of display means for displaying the natural language expressed by a combination of the words that are input from the word input means.

A further feature of the invention resides in that the natural language processing means comprises a function for analyzing the natural language expressed by a combination of the words from the word input means and for requesting the information needed to form data of control commands for a controlled system.

Other objects, features, advantages and effects of the present invention in addition to those mentioned above will become more apparent from the following detailed description and the accompanying drawings.

DESCRIPTION OF THE PREFERRED EMBODIMENT

Hereinafter an exemplary embodiment of the control data input apparatus according to the present invention will be described in detail with reference to the accompanying drawings.

Figure 1:
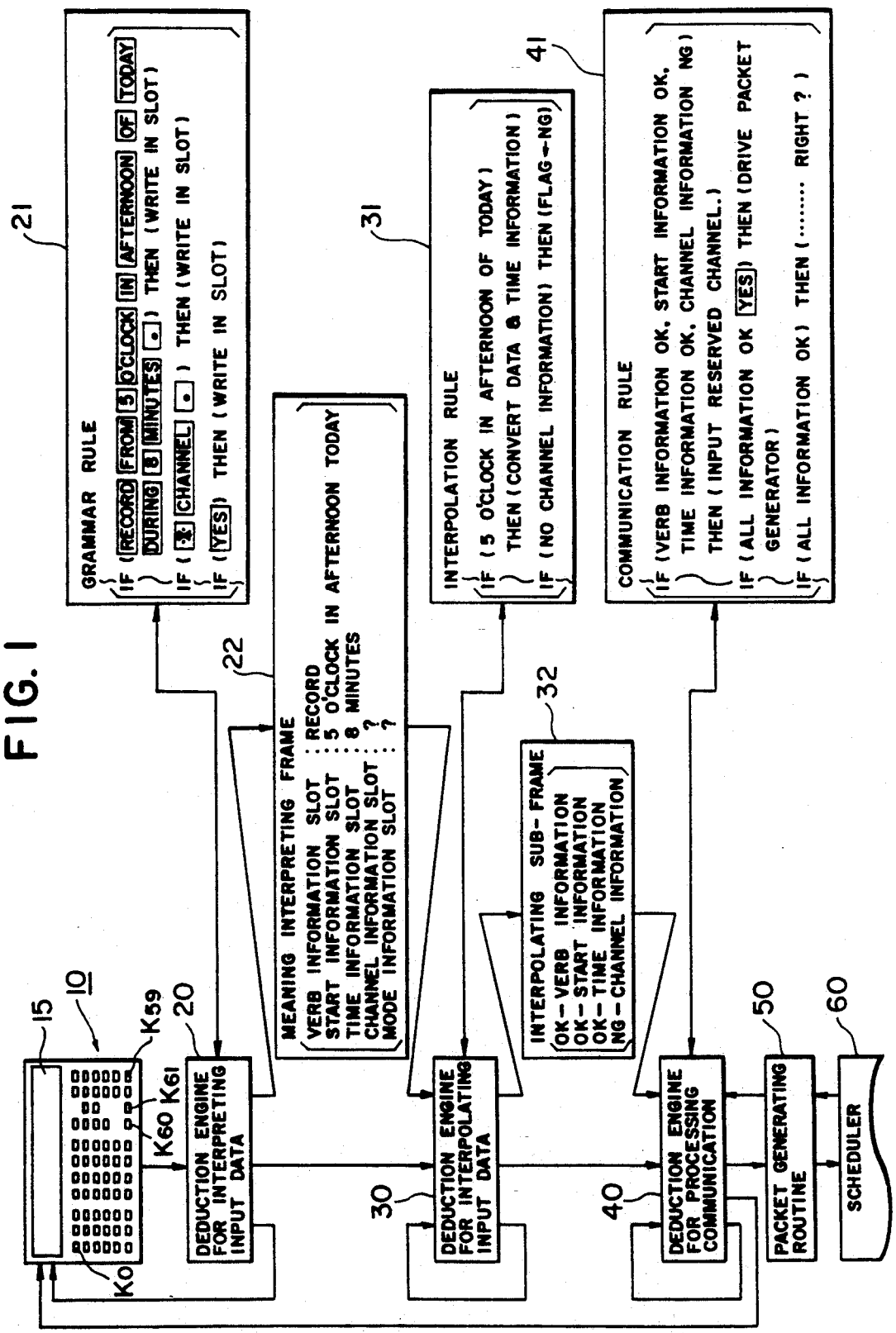
FIG. 1 shows a functional block diagram of an embodiment of the present invention.

FIG. 1 is a functional block diagram schematically showing one embodiment of the control data input apparatus used to perform program reservation in a video tape recorder.

The control data input apparatus in this embodiment comprises a keyboard 10 for inputting words; first through third deduction engines 20, 30, 40 described in an assembly language, a C language, a LISP language or the like for analyzing the natural language expressed by a combination of input words from the keyboard 10; a packet generating routine 50 for forming control command data of the contents represented in the natural language analyzed by the first through third deduction engines 20, 30, 40; and a scheduler 60 for reserving a program in accordance with the control command data obtained from the packet generating routine 50.

Figure 2:
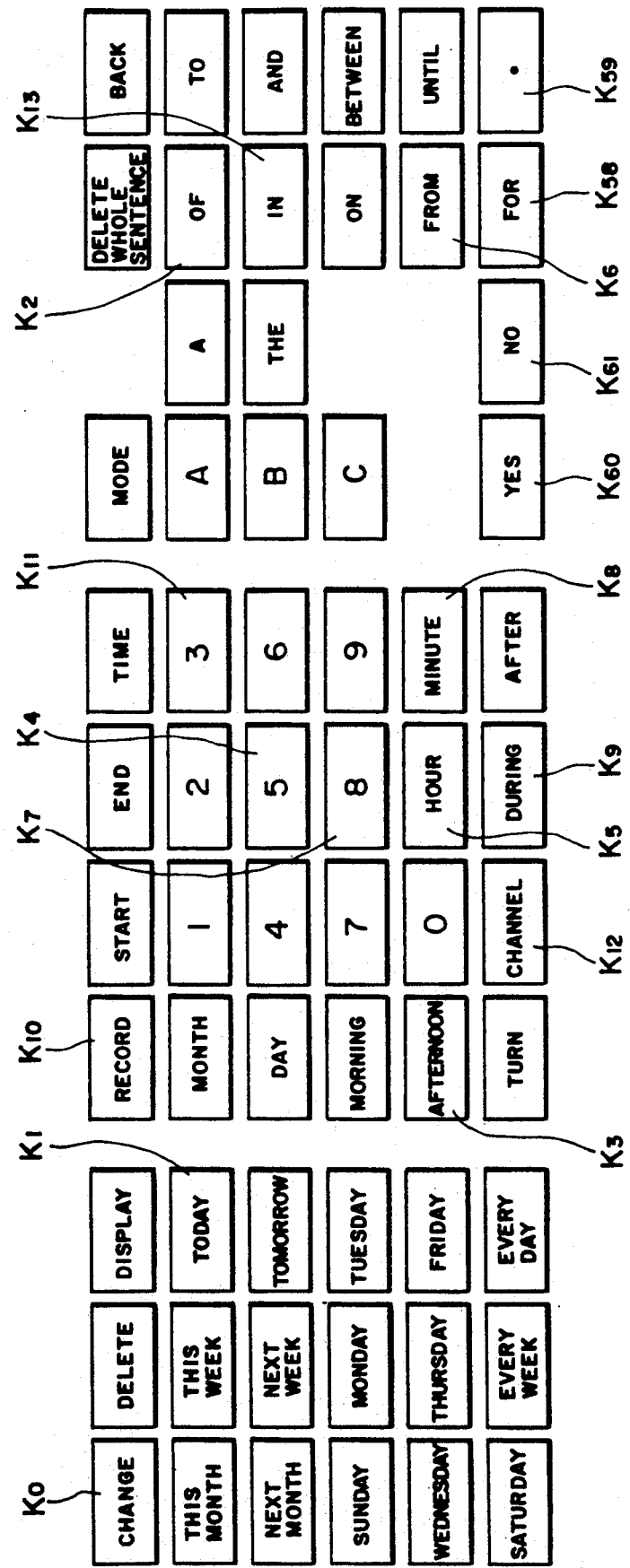
FIG. 2 shows a key arrangement of a keyboard used in the present invention.

The keyboard 10 has a total of 62 input keys $K_0$–$K_{61}$ which are arranged as illustrated in FIG. 2 and include word input keys $K_0$–$K_{58}$ for inputting words which are used to express, in a natural language, each control command for program reservation in a video tape recorder; a period input key $K_{59}$ for feeding a period "." at the end of the word input; and two answer input keys $K_{60}$ and $K_{61}$ for, respectively, feeding answer words "yes" and "no".

In this embodiment, a total of 59 kinds of words are selected for expressing the program reservation control commands in a natural language, including those indicative of data and reserved channel such as "THIS MONTH", "THIS WEEK", "TODAY", "NEXT MONTH", "NEXT WEEK", "TOMORROW", "EVERY WEEK", "EVERY DAY", "SUNDAY", "MONDAY", "TUESDAY", "WEDNESDAY", "THURSDAY", "FRIDAY", "SATURDAY", "MORNING", "AFTERNOON", "TURN", "MONTH", "DAY", "HOUR", "MINUTE", "DURING", "TIME", "AFTER", "CHANNEL"; those indicative of the numerical values of date and reserved channel, such as "1", "2", "3", "4", "5", "6", "7", "8", "9", "0"; those indicative of recording mode such as "MODE, "A", "B", "C"; those indicative of operations such as "CHANGE", "DELETE", "DISPLAY", "RECORD", "START", "END", "DELETE WHOLE SENTENCE", "BACK"; those indicative of prepositions and conjunctions such as "OF", "TO", "IN", "ON", "BETWEEN", "UNTIL", "AND", "FROM", "FOR" and those indicative of articles "A" and "THE". The 59 word input keys $K_0$–$K_{58}$ are arranged on the keyboard 10 and correspond respectively to the above 59 kinds of words.

The keyboard 10 further has a display 15 for displaying the natural language or communication processing message expressed by a combination of words which correspond to the input contents obtained by depressing the input keys $K_0$–$K_{61}$.

The first deduction engine 20 receives the input from the input keys $K_0$–$K_{61}$ of the keyboard 10 and processes the contents thereof as the data interpretable in the natural language which is expressed by a combination of the input words obtained by depressing the input keys $K_0$–$K_{61}$. For example, the first deduction engine 20 convert the input words into internal codes in accordance with a predetermined production-expressed grammar rule 21 and assigns the internal codes to predetermined information slots of a meaning interpreting frame 22. The grammar rule 21 is composed of ROM for example, wherein multiple sentence patterns that may be inputted by the operator are previously stored, and wherein data actually inputted by the operator is compared in sequence with the previously stored data. After comparison with the optimal sentence pattern, the individual words in the input data sentence are assigned respectively to predetermined information slots. Such process is well known in the field of artificial intelligence (AI).

The meaning interpreting frame 22 includes a variety of information slots such as "verb" information slot, "start" information slot, "time" information slot and "channel" information slot that classify the information necessary for program reservation in a video tape recorder with the natural language expressed by a combination of input words fed through depression of the input keys $K_0$–$K_{61}$. As for the grammar rule 21, there are also established some conditions for assigning the input words from the keys $K_0$–$K_{61}$ to the individual information slots of the meaning interpreting frame 22 as the information required for program reservation in the video tape recorder.

The grammar rule 21 can in addition to the above-described representation be represented by production expression, frame expression, semantic network expression or the like.

A description will follow with regard to an exemplary case of inputting, in a natural language, [RECORD FROM 5 O'CLOCK IN AFTERNOON OF TODAY DURING 8 MINUTES.] (hereinafter referred to as a first control input example) in the word order of [RECORD][FROM][5][HOUR][IN][AFTERNOON][OF][TODAY][DURING][8][MINUTE][.] by depressing the keys $K_{10}$, $K_6$, $K_4$, $K_5$, $K_{13}$, $K_3$, $K_2$, $K_9$, $K_7$, $K_8$, $K_{59}$ out of the entire keys $K_0$ and $K_1$–$K_{61}$ in the keyboard 10. In response to the word input information [RECORD] obtained by depressing the word input key $K_{10}$, the first deduction engine 20 converts this word input as verb information into an internal code and writes the internal code in the verb information slot of the meaning interpreting frame 22. Subsequently, in response to the word input information [FROM] obtained by depressing the word input key $K_6$, the engine 20 converts the preceding [5 O'CLOCK IN AFTERNOON OF TODAY] as information of start date and time into an internal code and writes the same in the start information slot. Then in response to the next word input information [DURING] obtained by depressing the word input key $K_9$, the engine converts the [8 MINUTE] as time information into an internal code and writes the same in the time information slot.

In the display 15 of the keyboard 10, there are visually displayed the words running, in the above control input example, [RECORD FROM 5 O'CLOCK IN AFTERNOON OF TODAY DURING 8 MINUTES.] in the natural language expressed by a row of the words inputted by depression of the input keys $K_0$–$K_{61}$. Therefore the user can perform an inputting operation while watching the words on the display 15 to confirm the input contents.

Subsequently the second deduction engine 30 interpolates the data needed with respect to the input contents expressed by a combination of the input words obtained by depressing the input keys $K_0$–$K_{61}$ on the keyboard 10. In this stage, a decision is made as to whether the content of the information slot of the meaning interpreting frame 22 can be used directly or not in accordance with the interpolation rule 31 which establishes the conditions of the above interpolation. In case the direct use of such content is impossible, the needed data is interpolated and a flag indicative of such processing state is added to an interpolating subframe 32.

Relative to the input content [5 O'CLOCK IN AFTERNOON OF TODAY] in the above-described first control input example, the second deduction engine 30 converts, with reference to an incorporated calendar timer, the content of the time information slot of the meaning interpreting frame 22 into an internal code corresponding to the actual data-time information. Furthermore, a flag indicating the non-existence of any information is added to the entire interpolating sub-frame of the information slots where none of the internal codes of the meaning interpreting frame 22 is given. In the first control input example where none of the channel information for a reserved program is inputted, the channel information slots of the meaning interpreting frame 22 are vacant. Therefore, a flag indicating the non-existence of channel information is added to the interpolating sub-frame in the channel information slot.

The third deduction engine 40 executes communication processing in conformity with the communication rule 41. On the basis of the flag added to the communication sub-frame 32 which represents the input content interpolated by the second deduction engine 30, a decision is made as to whether the minimum data required for program reservation has been input or not. Thereafter, the communication data corresponding to the input content from the keyboard 10 is fed to the display 15 of the keyboard 10.

In the first control input example, the third deduction engine 40 enables the display 15 of the keyboard 10 to visually display the message [INPUT RESERVED CHANNEL.] which message requests input of the channel information for the reserved program on the basis of the flag previously added to the interpolating sub-frame of the channel information slot when no channel information was available.

Then, if channel information such as [CHANNEL 3] (hereinafter referred to as second control input example) is inputted by depressing the input keys $K_{12}$, $K_{11}$ and $K_{59}$ in accordance with the request content displayed on the display 15 of the keyboard 10, the entire data needed for program reservation is thus acquired, so that the third deduction engine 40 visually displays, on the display 15 of the keyboard 10, the message [PROGRAM OF CHANNEL 3 IS RESERVED FROM 5:00 to 5:08 IN THE AFTERNOON OF SEP. 25. OK ?] for enabling the user to confirm the program reservation content shown in the first and second control input examples.

In confirming the program reservation content visually represented on the display 15 of the keyboard 10, the user depresses the communication input key $K_{60}$ for driving the first deduction engine 20 to accept the check input [YES]. Then the third deduction engine 40 feeds from the packet generating routine 50 to the scheduler 60 the control data to reserve a program of channel 3 from 5:00 to 5:08 in the afternoon of Sep. 25.

The scheduler 60 registers a reservation for recording a program of channel 3 from 5:00 to 5:08 in the afternoon of Sep. 25 in accordance with the control command data fed from the packet generating routine 50, and performs a control operation to record the reserved program in connection with the incorporated calendar timer.

In the control data input apparatus of this embodiment where any control command is inputted in the natural language expressed by a combination of the input words obtained through depression of the input keys $K_0$–$K_{61}$ of the keyboard 10, even if the word order is changed within the range of the aforementioned grammar rule 21, the first through third deduction engines 20, 30, 40 analyze the input natural language and carry out a program reservation by feeding from the packet generating routine 50 to the scheduler 60 the data of control commands corresponding to the program reservation content represented by such input natural language. That is, if the input word order corresponds to the reference data stored in the ROM of the grammar rule 21, it is possible to load the required data.

In this embodiment, the keyboard 10 is equipped with the display 15 for visually displaying the natural language expressed by a combination of the input words obtained through depression of the input keys $K_0$–$K_{61}$ of the keyboard 10, and the message for communication processing executed by the third deduction engine 40. However, the display 15 may be arranged on the control data input apparatus itself. Also, any existing display such as a television monitor or the like may be used as the display 15. Furthermore, it is also possible to employ, in place of such display means, audio output means for aurally producing, in the form of a vocal output, the communication processing message which represents the input control command.

In the control data input apparatus of the present invention, words of a natural language representing a plurality of control commands for a controlled system are fed to a natural word processing means by manipulating an input keyboard disposed in the word input means, then the natural language expressed by a combination of the words obtained from the word input means is analyzed by the natural language processing means, and the data of the control commands represented by the natural language is formed and fed to the controlled system. Thus, the control data input apparatus functions as a man-machine interface based on natural language processing which can be carried out with remarkable operational facility. Furthermore, according to the control data input apparatus of the present invention, the natural language expressed by a combination of the words from the word input means is outputted visually or aurally from the output means, hence enabling the user to perform a control data inputting operation with certainty while confirming the input content visually or aurally by the output obtained from the output means. Besides the above, the control data input apparatus of the invention is contrived in such a manner that the natural language expressed by a combination of the words from the word input means is analyzed by the natural language processing means, and input of the information needed to form data of the control commands for a controlled system is requested automatically, so that this apparatus functions as a communicative man-machine interface and enables the user to input the required control data without the necessity of paying particular attention to the operational procedure.

Thus, according to the present invention, there is provided an improved control data input apparatus which functions as a man-machine interface based on simple natural language processing with remarkable operational ease, whereby even a general user not skilled in manipulation of the electronic apparatus can freely utilize the various functions of any highly multi-functional electronic apparatus with a simplified operation.

What is claimed is:

1. A control data input apparatus comprising;

word input means having an input keyboard for manual actuation by a user and including a plurality of keys corresponding to a plurality of words of a natural language and to a plurality of alphanumeric characters, combinations of said words and characters selected by the user representing control command sentences for a controlled system; and natural language processing means responsive to said plurality of words and alphanumeric characters from said input keyboard of said word input means for analyzing said control command sentence formed by a selected combination of said words and characters from said word input means and determining that said selected combination forms a complete sentence that is a valid one of said control command sentences and forming data corresponding to said complete sentence represented by said selected combination of natural language words and alphanumeric characters, wherein said data corresponding to said yield one of said control command sentences represented by said natural language words and alphanumeric characters and analyzed by said natural language processing means is fed to said controlled system.

2. A control data input apparatus according to claim 1, further comprising means for producing an audio signal audible to the user in said natural language corresponding to said complete sentence formed by said selected combination of said words and characters from said word input means.

3. A control data input apparatus according to claim 1, wherein said natural language processing means further comprises means for determining words and characters missing from an otherwise complete sentence and requesting from the user the missing words and characters needed to form a complete sentence that is a valid one of said control command sentences for said controlled system.

* * * * *